United States Patent [19]
Hlustik

[11] 4,272,858
[45] Jun. 16, 1981

[54] METHOD OF MAKING A MOCCASIN SHOE
[75] Inventor: John Hlustik, Brentwood, England
[73] Assignee: K. Shoemakers Limited, Kendal, England
[21] Appl. No.: 5,680
[22] Filed: Jan. 23, 1979
[30] Foreign Application Priority Data Jan. 26, 1978 [GB] United Kingdom ............... 3227/78

[51] Int. Cl.[3] .................. A43D 9/00; A43B 3/14; A43C 13/08
[52] U.S. Cl. .................. 12/142 MC; 36/11; 36/14
[58] Field of Search ....... 12/142 R, 142 MC, 142 RS, 12/142 T; 36/11, 14

[56] References Cited
U.S. PATENT DOCUMENTS

| 2,806,234 | 9/1957 | Potvin | 12/142 MC |
| 3,676,883 | 7/1972 | Peacock | 12/142 MC |

FOREIGN PATENT DOCUMENTS

| 406170 | 9/1966 | Australia | 12/142 MC |
| 1141113 | 10/1957 | France | 36/11 |

Primary Examiner—Patrick D. Lawson
Attorney, Agent, or Firm—Fleit & Jacobson

[57] ABSTRACT

A moccasin shoe is proposed to be made by a method which comprises cutting the parts of an upper including a vamp, preparing the underside of the vamp for fusing, assembling the back part of the shoe, placing and fixing the thus formed and prepared upper, which does not include a plug, in a mold which is injected with polyurethane or other suitable thermoplastic material to form a sole which is bonded to the underside of the upper and also, by means of an upstanding peripheral flange to the side margins of the upper, removing the upper from the mold, and thereafter stitching a plug portion to the upper margin of the vamp.

11 Claims, 10 Drawing Figures

METHOD OF MAKING A MOCCASIN SHOE

This invention relates to a method of making a moccasin shoe in a simple and economical manner and which avoids the need for conventional lasting.

In the traditional moccasin the upper comprises a single piece of leather or other material which is intended to cover the sides and sole of the wearer's foot and of which the front edge parts are lapstitched to the side margins of a so-called plug which is intended to cover the wearer's instep.

Such moccasins are very simple to make and are very comfortable to wear, since because of the need to wrap around the foot the upper is made out of soft and accommodating material.

In a more developed form of moccasin—the so-called moccasin shoe—there is attached to the sole part of the upper a separate sole in order to combine the advantage of comfort with the advantage of durability of the sole in use.

The main problem in the production of these moccasin shoes is that it is relatively difficult to attach the sole to the sole portion of the upper by adhesion or stitching or by a combination of both methods. Even when considerable care is used there is invariably a tendency for the sole and the upper to peel apart around the bend between the upper side portions and the upper sole portion.

Apart from this it has been the practice to use conventional machinery for lasting the back of a moccasin shoe thereby increasing the complexity and the cost of manufacture.

It is the general object of the present invention to provide an improved and simplified method for manufacturing a moccasin shoe which is not subject to the aforementioned problem and disadvantage.

In accordance with the invention therefore such a method comprises cutting the parts of an upper including a vamp, preparing, if necessary, the underside of the vamp for bonding, assembling the back part of the shoe, placing and fixing the thus formed and prepared upper, which does not include a plug, in a mould which is injected with polyurethane or other suitable thermoplastic material to form a sole which is bonded to the underside of the upper and also, by means of an upstanding peripheral flange, to the side margins of the upper, removing the upper from the mould, and thereafter stitching a plug portion to the upper margin of the vamp.

Preferably as well as being bonded to the flange the upper is stitched thereto before attachment of the plug portion to the upper margin of the vamp.

If necessary before the moulding operation the upper is prepared for a string lasting operation which is performed after the sole has been moulded.

A preferred mode of performing the improved and simplified method is hereinafter described with reference to the accompanying schematic drawings in which:

FIGS. 1 and 1A respectively illustrate the shape of a mocassin vamp and plug;

Figure 1:
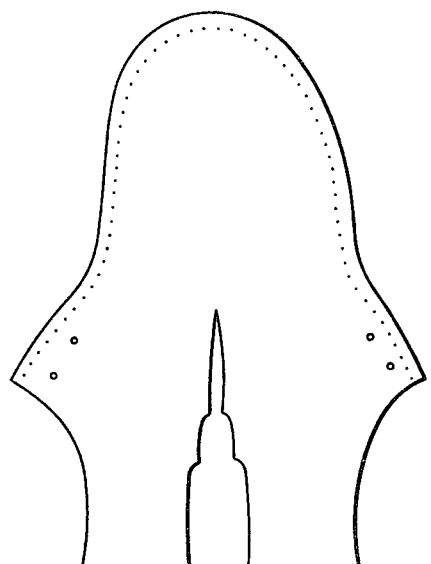
Figure 1A:
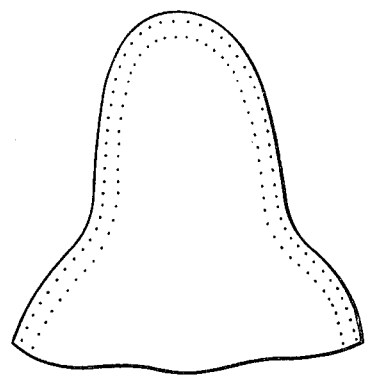

The component parts for the upper of a moccasin shoe are first cut in the normal way with the vamp and the plug having the shapes depicted in FIG. 1 and FIG. 1A. Because of the accuracy required in subsequent location in a mould any reduction in substance necessary for ease of lasting—i.e. shaping of the upper around the last—must be kept to very critical limits giving a final variation in thickness of not more than 0.2 mm.

The vamp (FIG. 1) is first of all prepared for the sole adhesion process preferably by a matrix skiving operation. This involves removing about 0.25 of the grain of the leather from the area to which the sole will finally be bonded. The vamp is now stitched to the parts which form the back and top line of the shoe but at this stage the plug (FIG. 1A) is not assembled into the upper.

Figure 2:
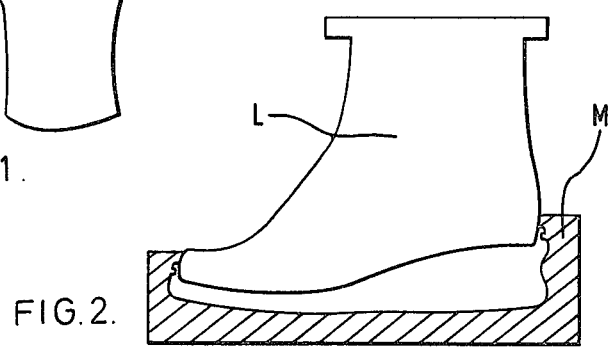
FIGS. 2 and 2A are respectively side and end views partly in cross-section of a mould and metal moulding last.
Figure 2A:
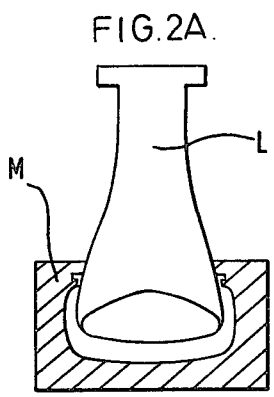
Figure 4:
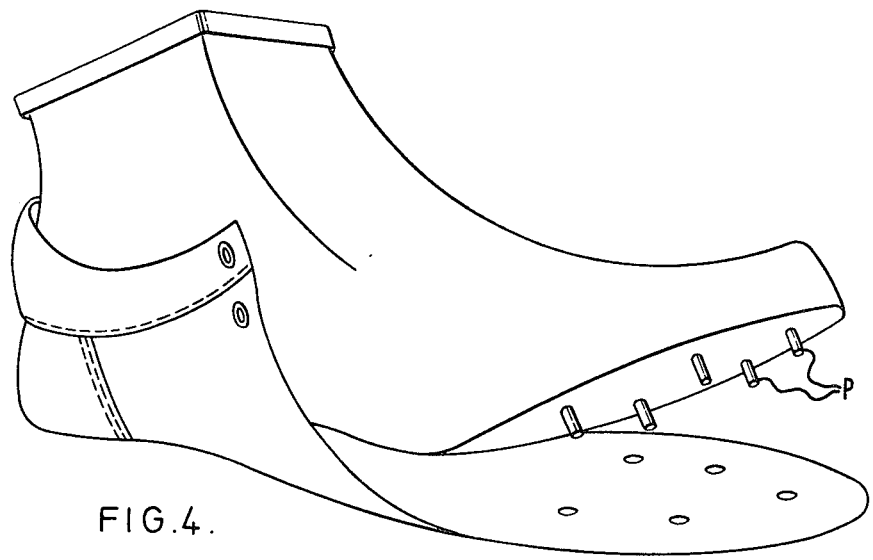
FIG. 4 is a perspective view showing a mode of locating an upper correctly on a last.
Figure 5:
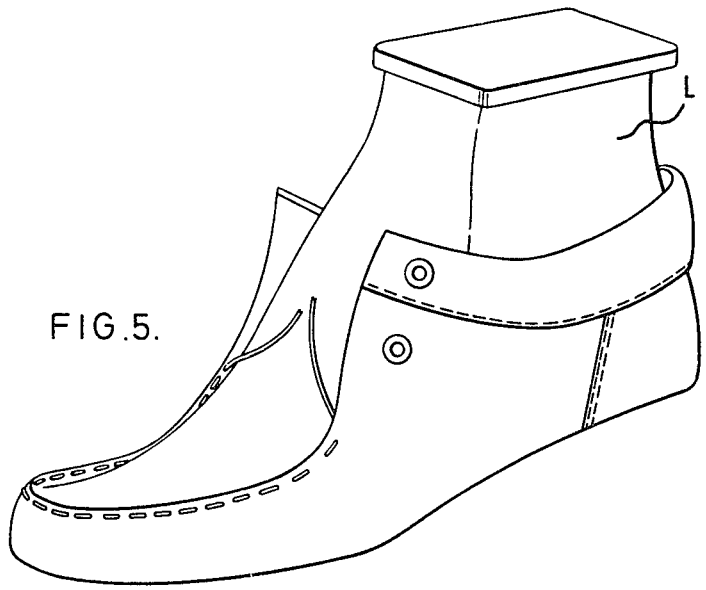
FIG. 5 is a perspective view showing a string-lasting part upper.

To the top margin of the thus prepared upper there is attached, by means of looped stitches, a freely movable tape or draw string which is used for the performance of a string-lasting operation on a metal last to which the part-upper is now applied. FIGS. 2 and 2A show this metal last L in association with a mould M; the lower surface of the upper mounted on the last closes the mould cavity. The upper is located accurately upon the last as shown in FIG. 4 by using pins 8 which pierce the sole part of the upper or by use of other suitable markers. The string lasting operation across the opening where the plug will finally be fitted is effective as shown in FIG. 5 to draw the upper tight to the last thus shaping the upper at the forepart into its final vertical position and performing the first stage of the seat lasting operation, relying upon the design of the mould and the achievement of accurate thicknesses in the materials to provide a sufficiently accurate contour around the seat area.

Figure 3:
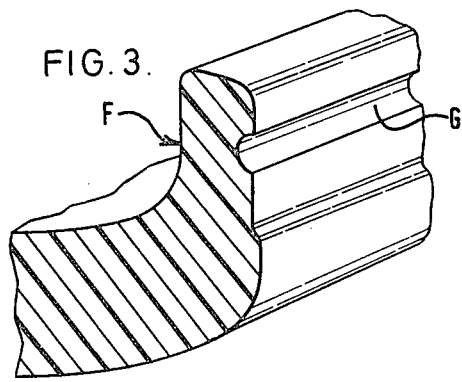
FIG. 3 is a fragmentary perspective sectional view of a moulded sole.
Figure 6:
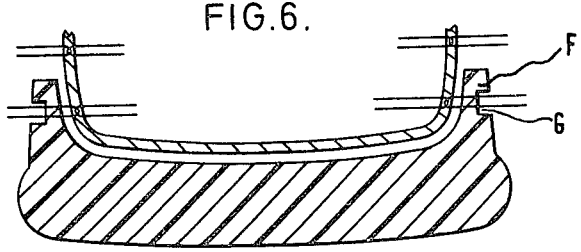
FIG. 6 is an exploded diagram showing how the upper is to be stitched to the vertical flanged part of the moulded sole.
Figure 7:
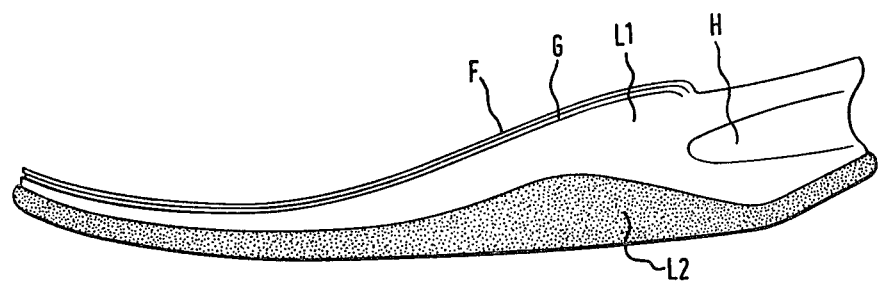
FIG. 7 is a side view of a moulded sole showing a two-colour moulding effect.
Figure 8:
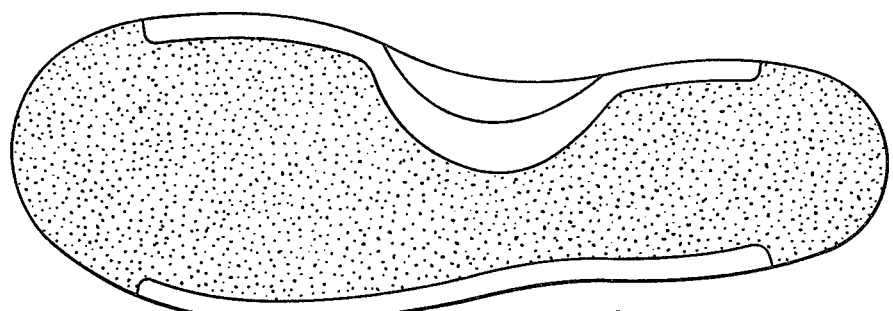
FIG. 8 is an inverted plan view of a sole showing its tread pattern.

The purpose of the mould, into which liquid polyurethane or other suitable thermoplastic material is now injected, is to form and bond to the lower surface and bottom side margins of the upper a thick sole S (FIGS. 6, 7 and 8). As shown most clearly in FIGS. 2A and 3 the mould is effective to produce a flange F around the periphery of the shoe which is used for the subsequent secondary attachment of the sole by means of a row of stitching T, the flange F being formed with an external peripheral groove G into which the stitching is sunk, the stitching operation being permitted or facilitated since the moccasin shoe has not yet been closed up by the fitting of the plug portion and there is therefore free access to the inside of the shoe.

The sole can be moulded by separately and successively injecting layers of plastics material compounds, such as polyurethane compounds having different physical characteristics and which may have different textures and colours. Thus FIG. 7 illustrates successively injected layers L1, L2. Layer L1 is made of a relatively soft light and flexible compound whereas layer L2 which constitutes the wearing surface is a relatively hard and less flexible compound. Further, the floor of the mould can be formed so as to create any desired sole tread pattern such as for instance the one illustrated in FIG. 8 which, when polyurethane is used as the sole material, is designed to minimise slip in certain surface conditions. FIG. 7 also shows the heel of the shoe formed with a peripheral groove H in the manner of a concertina, such configuration serving to provide enhanced cushioning or resilience when the wearer of the shoe is walking.

The moccasin shoe is completed by attaching the plug by stitching to the vamp in conventional manner. The upper is finally formed to the last shape in conventional manner with a heat setting operation if desired.

Although throughout the foregoing description reference has been made to a moccasin shoe it is to be understood that the method of the invention is applicable to the manufacture of other forms of footwear, e.g. a boot, possessed of the traditional moccasin characteristics as defined hereinbefore.

Further, insofar as the present invention discloses a method of making a moccasin shoe wherein a sole is injected onto a prepared upper before the upper is finally shaped on a last it is believed that such method could be developed for use in the manufacture of shoes of non-moccasin type although no claim is made as to the ultimate feasibility of such method or its general application.

I claim:

1. A method of making a moccasin shoe comprising, in sequence, the following:
   cutting parts of an upper including a vamp;
   preparing the underside of the vamp for bonding;
   assembling the back part of the shoe;
   mounting the thus formed and prepared upper on a last;
   placing and fixing the mounted upper in a mould;
   successively injecting layers of polyurethane or other suitable thermoplastic material having different physical properties into the mould to form a sole bonded to the underside of the upper and also, by means of an upstanding peripheral flange having an external peripheral groove formed therein, to the side margins of the upper;
   removing the upper and sole assembly from the mould;
   sinking stitching through the groove into the upper to thereby attach the sole to the upper; and
   stitching a plug portion to the upper margin of the vamp.

2. A method as claimed in claim 1 in which the layers have different textures or colours.

3. A method as claimed in claim 1 wherein, before the moulding operation, the upper is prepared for a string lasting operation.

4. A method as claimed in claim 1 in which the heel portion of the sole has a peripheral groove formed by moulding therein.

5. A method as claimed in claim 1 in which the upper is located on the last by means of pins provided on the last and which pierce the sole part of the upper.

6. A method of making a moccasin shoe comprising, in sequence, the following:
   cutting parts of an upper including a vamp;
   preparing the underside of the vamp for bonding;
   assembling the back part of the shoe;
   mounting the thus formed and prepared upper on a last;
   placing and fixing the mounting upper in a mould;
   injecting polyurethane or other suitable thermoplastic material into the mould to form a sole bonded to the underside of the upper and also, by means of an upstanding peripheral flange having an external peripheral groove formed therein, to the side margins of the upper, a heel portion of the sole having a peripheral groove formed therein by moulding;
   removing the upper and sole assembly from the mould;
   sinking stitching through the groove into the upper to thereby attach the sole to the upper; and
   stitching a plug portion to the upper margin of the vamp.

7. A method of making a moccasin shoe comprising, in sequence, the following:
   cutting parts of an upper including a vamp;
   preparing the underside of the vamp for bonding;
   assembling the back part of the shoe;
   mounting the thus formed and prepared upper on a last, the last having pins which pierce a sole part of the upper to thereby locate the upper on the last;
   injecting polyurethane or other suitable thermoplastic material into the mould to form a sole bonded to the underside of the upper and also, by means of an upstanding peripheral flange having an external peripheral groove formed therein, to the side margins of the upper;
   removing the upper and sole assembly from the mould;
   sinking stitching through the groove into the upper to thereby attach the sole to the upper; and
   stitching a plug portion to the upper margin of the vamp.

8. A method as claimed in claim 6 or 7 wherein, the sole is formed by successively injecting layers of thermoplastics materials having different physical properties.

9. A method as claimed in claim 1, 6 or 7 in which there is successively injected a layer of soft, light and relatively flexible material followed by a layer of harder and less flexible material intended to constitute a wearing surface.

10. A method as claimed in claim 9 in which the layers have different textures or colours.

11. A method as claimed in claim 8 wherein, a line of stitching is inserted through the upper only above the stitching attaching the sole to the upper.

* * * * *